US012313991B2

(12) United States Patent
Iwami et al.

(10) Patent No.: US 12,313,991 B2
(45) Date of Patent: May 27, 2025

(54) FIXING DEVICE AND IMAGE FORMING APPARATUS INCORPORATING THE SAME WHICH INCLUDES A LUBRICANT SUPPLIER AND A LUBRICANT COLLECTOR

(71) Applicants: Shuntaroh Iwami, Kanagawa (JP); Jun Ogino, Kanagawa (JP); Kazuto Shibuya, Kanagawa (JP)

(72) Inventors: Shuntaroh Iwami, Kanagawa (JP); Jun Ogino, Kanagawa (JP); Kazuto Shibuya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/388,254

(22) Filed: Nov. 9, 2023

(65) Prior Publication Data

US 2024/0160129 A1 May 16, 2024

(30) Foreign Application Priority Data

Nov. 11, 2022 (JP) ................................ 2022-180794

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
USPC ........................................................ 399/325
See application file for complete search history.

(56) References Cited

U.S. PATENT DOCUMENTS

2015/0210091 A1 7/2015 Hoshina et al.
2017/0176899 A1* 6/2017 Okamoto .......... G03G 15/2025
2017/0269524 A1 9/2017 Yamaji et al.
2017/0269526 A1 9/2017 Yuasa et al.
2018/0081309 A1 3/2018 Hirose et al.
2020/0231397 A1 7/2020 Kawamata et al.

FOREIGN PATENT DOCUMENTS

JP 2002-372881 A 12/2002
JP 2006-309060 A 11/2006
JP 2014-174358 A 9/2014
JP 2018-072379 A 5/2018
JP 2020-071340 A 5/2020

OTHER PUBLICATIONS

Computer translation of applicant cited document JP2020-71340A to Yashiro Akira. (Year: 2020).*

* cited by examiner

*Primary Examiner* — Quana Grainger
(74) *Attorney, Agent, or Firm* — XSENSUS LLP

(57) ABSTRACT

A fixing device includes a belt, a pad, a pressure rotator, a lubricant supplier, and a collector. The belt forms a loop. The pad is inside the loop of the belt and contacts the belt. The pressure rotator presses the belt against the pad to form a fixing nip between the belt and the pressure rotator. The lubricant supplier supplies lubricant to an inner face of the belt. The collector collects the lubricant. The collector has a first end and a second end. The first end contacts an inner face of one end of the belt in a width direction of the belt. The second end contacts the inner face of another end of the belt opposite to the one end in the width direction.

20 Claims, 5 Drawing Sheets

FIXING DEVICE AND IMAGE FORMING APPARATUS INCORPORATING THE SAME WHICH INCLUDES A LUBRICANT SUPPLIER AND A LUBRICANT COLLECTOR

CROSS-REFERENCE TO RELATED APPLICATION

This patent application is based on and claims priority pursuant to 35 U.S.C. § 119(a) to Japanese Patent Application No. 2022-180794, filed on Nov. 11, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

An electrophotographic image forming apparatus includes a fixing device. The fixing device includes a heater, a fixing belt having an endless shape and heated by the heater, and a pressing member in contact with the fixing belt to form a fixing nip. A recording medium on which a toner image is transferred passes through the fixing nip, and heat and pressure in the fixing nip fix the toner image onto the recording medium.

One type of fixing device includes a nip formation pad inside the loop of the fixing belt and the pressing member made of an elastic material. The pressing member is pressed against the nip formation pad via the fixing belt and elastically deformed to form the fixing nip. In the fixing device, the fixing belt slides on the nip formation pad fixed in the fixing device. To reduce a frictional resistance caused by the fixing belt sliding on the nip formation pad, lubricant is applied to the inner face of the fixing belt.

SUMMARY

This specification describes an improved fixing device that includes a belt, a pad, a pressure rotator, a lubricant supplier, and a collector. The belt forms a loop. The pad is inside the loop of the belt and contacts the belt. The pressure rotator presses the belt against the pad to form a fixing nip between the belt and the pressure rotator. The lubricant supplier supplies lubricant to an inner face of the belt. The collector collects the lubricant. The collector has a first end and a second end. The first end contacts an inner face of one end of the belt in a width direction of the belt. The second end contacts the inner face of another end of the belt opposite to the one end in the width direction.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
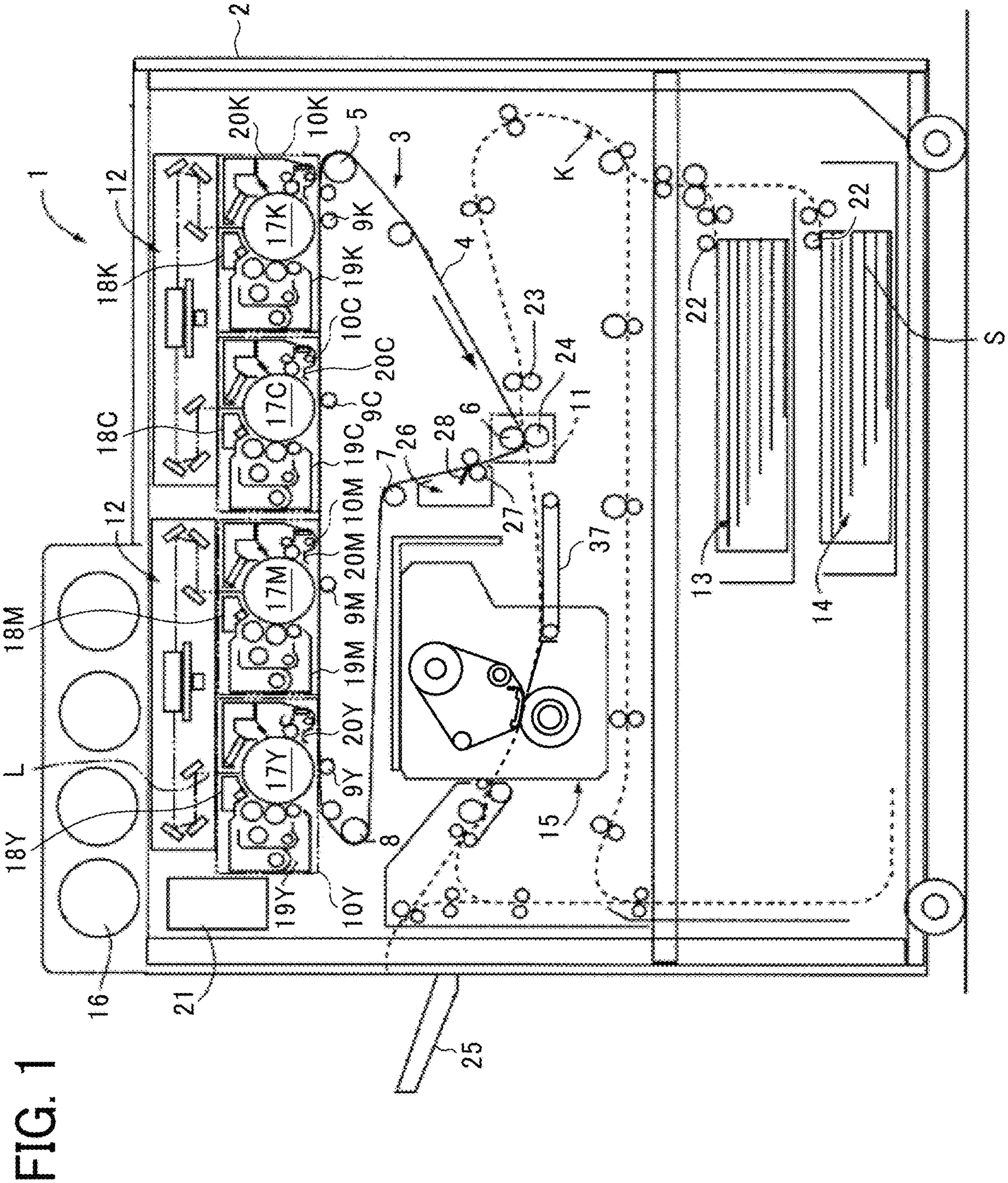
FIG. 1 is a schematic front view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic front view of an image forming apparatus 1 according to an embodiment of the present disclosure. In FIG. 1, the image forming apparatus 1 is a printer and includes an intermediate transfer unit 3 substantially at the center of an apparatus main body 2.

The intermediate transfer unit 3 includes an intermediate transfer belt 4 as an intermediate transferor, and the intermediate transfer belt 4 is stretched in a loop shape by a plurality of support rollers. The support rollers include a drive roller 5 that rotates the intermediate transfer belt 4 clockwise in FIG. 1, a secondary transfer backup roller 6, driven rollers 7 and 8, and four primary transfer rollers 9Y, 9M, 9C, and 9K.

The intermediate transfer belt 4 is stretched in a posture like a substantially inverse triangle. Above an upper face of the stretched intermediate transfer belt 4 that is the upper side of the inverse triangle, four process cartridges 10Y, 10M, 10C, and 10K are arranged side by side in the horizontal direction. The process cartridges 10Y, 10M, 10C, and 10K correspond to yellow, magenta, cyan, and black, respectively.

The process cartridge 10Y includes parts to form a yellow toner image, and the formed yellow toner image is transferred onto the intermediate transfer belt 4. Similarly, the process cartridge 10M includes parts to form a magenta toner image, the process cartridge 10C includes parts to form a cyan toner image, and the process cartridge 10K includes parts to form a black toner image.

The magenta, cyan, and black toner images are transferred from the process cartridges 10M, 10C, and 10K to the intermediate transfer belt 4 at primary transfer positions at which the process cartridges 10M, 10C, and 10K face the primary transfer rollers 9M, 9C, and 9K, respectively. The intermediate transfer belt 4 rotates, and the color toner image primarily transferred onto the intermediate transfer belt 4 reaches a secondary transfer portion 11.

In FIG. 1, above the process cartridges 10Y, 10M, 10C, and 10K, a pair of exposure units 12 are disposed, one of the pair of the exposure units irradiates photoconductor drums 17Y and 17M with exposure lights L based on yellow image data and magenta image data, and the other one irradiates photoconductor drums 17C and 17K with exposure lights L based on cyan image data and black image data. The pair of exposure units 12 includes a laser controller that receives image data of each color based on image data of a document transmitted from a scanner to a controller 21 and semiconductor lasers that emit four exposure light beams L. The exposure light beams L scan photoconductor drums 17Y, 17M, 17C, and 17K in the process cartridges 10Y, 10M, 10C, and 10K and write electrostatic latent images of yellow, magenta, cyan, and black on the surfaces of the photoconductor drums 17Y, 17M, 17C, and 17K, respectively.

As illustrated in FIG. 1, the image forming apparatus 1 includes sheet trays 13 and 14 accommodating sheets S as recording media, a fixing device 15 in which heat and pressure fix an unfixed toner image transferred onto the sheet S, and toner bottles 16 each accommodating toner therein.

The following describes the process cartridges 10Y, 10M, 10C, and 10K. Since the process cartridges 10Y, 10M, 10C, and 10K have the same configuration except for the color of toner to be used, the process cartridge 10Y is described as a representative.

The process cartridge 10Y includes the photoconductor drum 17Y as an image bearer disposed substantially at the center of the process cartridge 10Y and, around the photoconductor drum 17Y, includes a charging device 18Y to charge the photoconductor drum 17Y and a developing device 19Y to develop the electrostatic latent image formed on the surface of the photoconductor drum 17Y.

In addition, the process cartridge 10Y includes, around the photoconductor drum 17Y, a photoconductor cleaner 20Y to collect untransferred toner remaining on the surface of the photoconductor drum 17Y and a discharger to remove electric charge on the photoconductor drum 17Y. The process cartridge 10Y includes a casing as a common support member supporting the above-described parts and is configured to be integrally attachable to and detachable from the apparatus main body 2 as a single unit to enhance maintainability.

Image forming operations of the image forming apparatus 1 are described below. First, the scanner transmits image data to the controller 21 including a microcomputer and being disposed inside the apparatus main body 2, and the controller 21 decomposes the received image data into four color image data of yellow, magenta, cyan, and black. For example, the controller 21 converts yellow image data into electrical signals and transmits the electrical signals to the exposure unit 12. The exposure unit 12 irradiates the photoconductor drum 17Y with the exposure light L such as laser light based on the yellow image data, i.e., the electrical signals transmitted from the controller 21.

The photoconductor drums 17Y, 17M, 17C, and 17K rotate counterclockwise in FIG. 1. The charging devices 18Y, 18M, 18C, and 18K uniformly charge surfaces of the photoconductor drums 17Y, 17M, 17C, and 17K. Irradiating the charged surface of the photoconductor drum 17Y with the exposure light L forms an electrostatic latent image corresponding to the yellow image data. Similarly, electrostatic latent images are formed on the surfaces of the photoconductor drums 17M, 17C, and 17K. The rotation of the photoconductor drum 17Y conveys the formed electrostatic latent image to a portion in which the photoconductor drum 17Y faces the developing device 19Y, and the developing device 19Y visualizes the electrostatic latent image. Similarly, developing devices 19M, 19C, and 19K visualize the electrostatic latent images.

The yellow, magenta, cyan, and black toners are stored in the toner bottles 16 and are supplied to the developing devices 19Y, 19M, 19C, and 19K, respectively. A stirrer in the developing device stirs and mixes the toner and carrier. Stirring the toner with the carrier triboelectrically charges the toner. Developer including the charged toner and the carrier is supplied to the developing roller. The developing roller rotates, and the developer borne on the developing roller passes through the gap between a doctor blade and the developing roller to have a uniform layer thickness. Subsequently, the developer on the developing roller comes into contact with the photoconductor drum, and the toner adheres to the electrostatic latent image on the photoconductor drum. As a result, the toner images are formed on the photoconductor drums 17Y, 17M, 17C, and 17K. The controller 21 controls the exposure units 12 and the devices in the process cartridges 10Y, 10M, 10C, and 10K to periodically form toner patterns on the photoconductor drums 17Y, 17M, 17C, and 17K. Reflection density sensors that are optical sensors detect image densities of the toner patterns on the photoconductor drums 17Y, 17M, 17C, and 17K. Based on the densities detected by the reflection density sensors, the controller 21 controls toner supply to the developing devices 19Y, 19M, 19C, and 19K.

The toner images developed by the developing devices 19Y, 19M, 19C, and 19K and formed on the surfaces of the photoconductor drums 17Y, 17M, 17C, and 17K are primarily transferred onto the intermediate transfer belt 4 at portions at which the photoconductor drums 17Y, 17M, 17C, and 17K face the primary transfer rollers 9Y, 9M, 9C, and 9K. After the primary transfer step, a small amount of untransferred toner that has not been transferred to the intermediate transfer belt 4 remains on the surface of each of the photoconductor drums 17Y, 17M, 17C, and 17K. Photoconductor cleaners 20Y, 20M, 20C, and 20K each include a brush, a roller, or a blade and each remove the untransferred toner on each of the photoconductor drums 17Y, 17M, 17C, and 17K. Subsequently, a discharger in each of the process cartridges removes electric charge on the photoconductor drum and enables starting a next image forming process.

Primarily transferring yellow, magenta, cyan, and black toner images from the process cartridges 10Y, 10M, 10C, and 10K to the intermediate transfer belt 4 and superimposing the toner images on the intermediate transfer belt 4 form a full-color toner image on the intermediate transfer belt 4. The intermediate transfer belt 4 rotates, and the full-color toner image reaches the secondary transfer portion 11. At the same time, one of the sheet trays 13 and 14 is automatically or manually selected. For example, if the sheet tray 13 is selected, a feed roller 22 disposed on the sheet tray 13 rotates to feed one of the sheets S stored in the sheet tray 13 to a conveyance passage K, and the sheet S passes through the conveyance passage K and reaches a registration roller pair 23.

The registration roller pair 23 rotates to convey the sheet S to the secondary transfer portion 11, timed to coincide with the arrival of the full-color toner image on the intermediate transfer belt 4.

A secondary transfer roller 24 in the secondary transfer portion 11 is pressed against a secondary transfer backup roller 6 and contacts the intermediate transfer belt 4 to form a secondary transfer nip, the full-color toner image is transferred from the intermediate transfer belt 4 onto the sheet S in the secondary transfer nip. A conveyor 37 conveys the sheet S to which the full-color toner image is transferred to a fixing device 15, and heat and pressure fix the full-color toner image onto the sheet in the fixing device 15. After the full-color toner image is fixed onto the sheet S, the full-color toner image on the sheet S as an output image is ejected onto an output tray 25.

After passing through the secondary transfer portion 11, the intermediate transfer belt 4 reaches a belt cleaner 26 disposed downstream from the secondary transfer portion 11 in a rotation direction of the intermediate transfer belt 4. The belt cleaner 26 includes a cleaning brush 27 and a cleaning blade 28 and removes residual toner on the intermediate transfer belt 4. Thus, a series of the image forming processes is completed.

Figure 2:
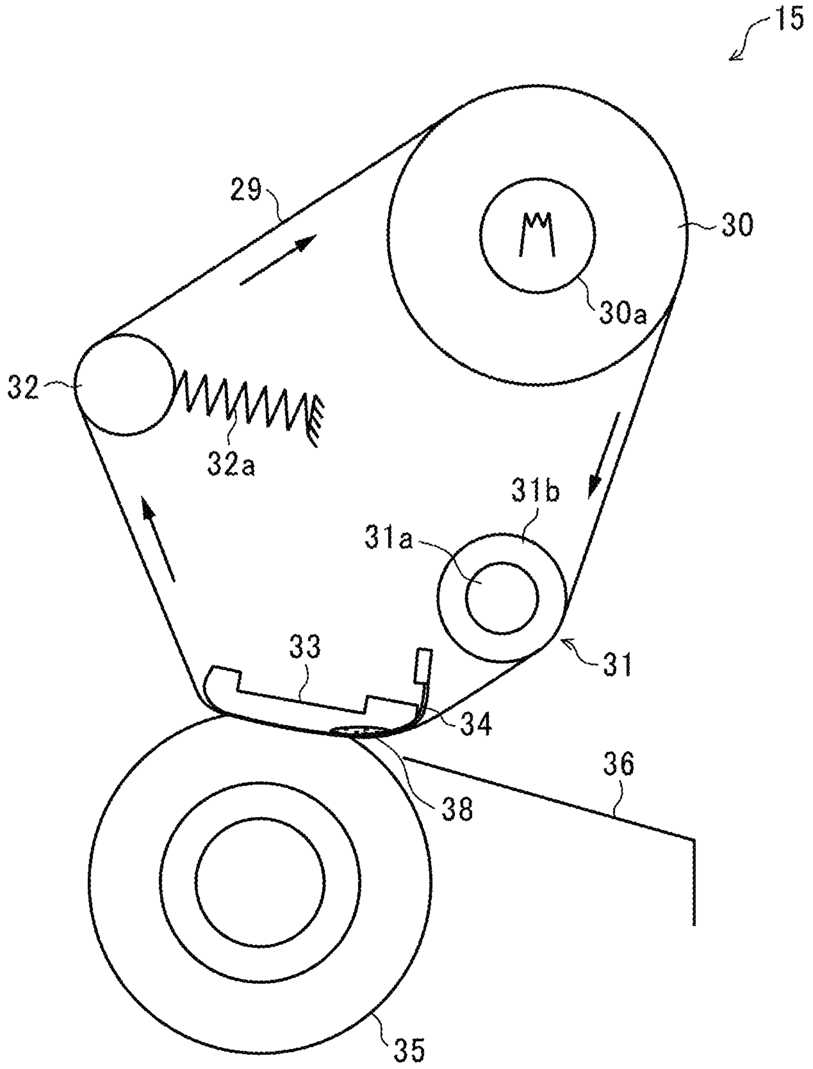
FIG. 2 is a schematic view of a fixing device according to an embodiment of the present disclosure.
Figure 3:
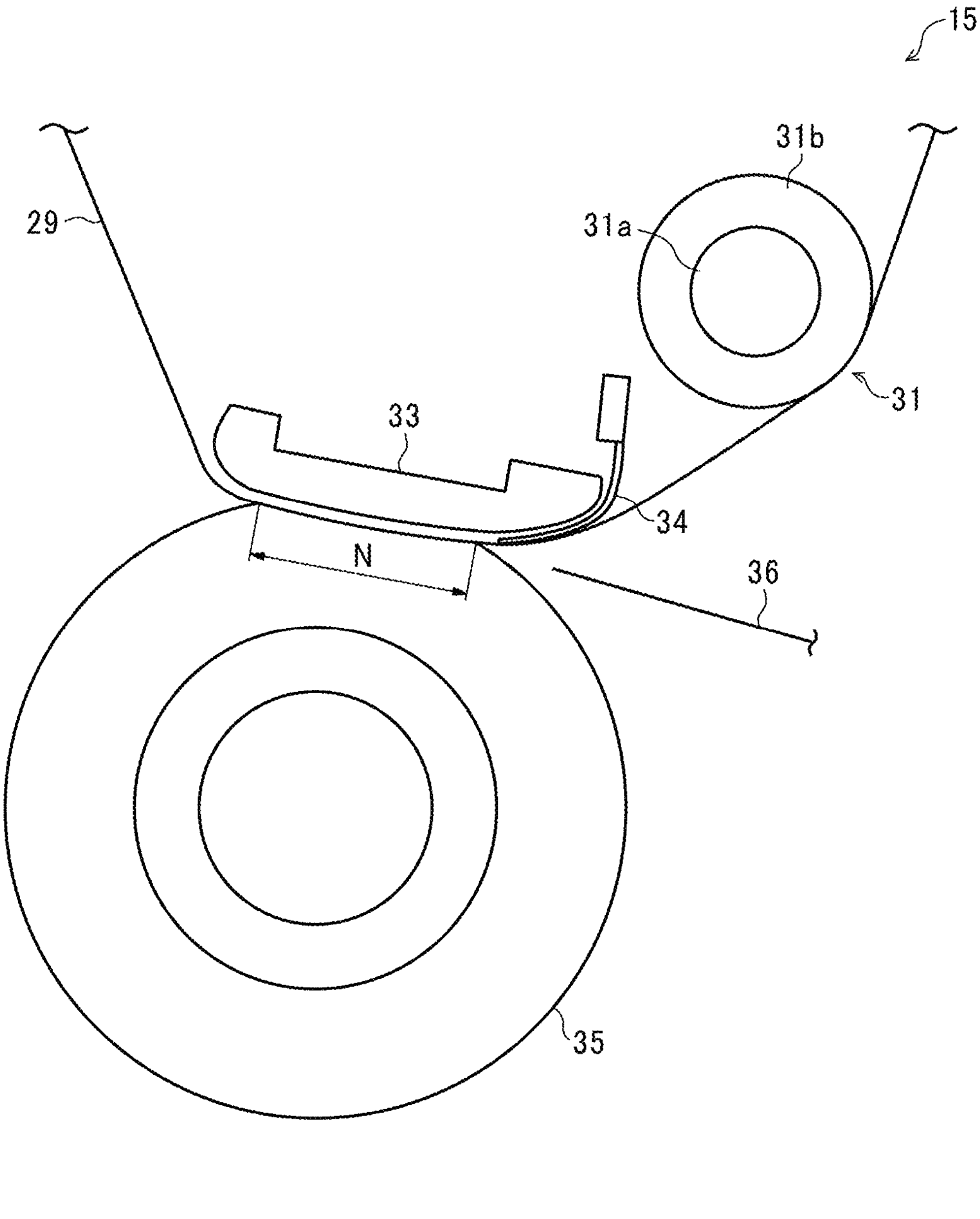
FIG. 3 is a partially enlarged view of FIG. 2 to illustrate the fixing device according to the embodiment of the present disclosure.

The following describes the configuration and operations of the fixing device 15 in the image forming apparatus 1. FIG. 2 is a schematic view of the fixing device 15, and FIG. 3 is a partially enlarged view of FIG. 2.

In FIG. 2, the fixing device 15 includes a fixing belt 29 as a belt that is an endless belt, a heating roller 30 as a heating rotator, a supply roller 31 as a supplier, and a tension roller 32 as a support. The fixing device 15 further includes a sliding pad 33 as a pressing member, a collector 34, a pressure roller 35 as a pressure rotator, and a guide 36. Each of the widths of the fixing belt 29, the sliding pad 33, the collector 34, and the pressure roller 35 in a width direction of the sheet S orthogonal to the sheet conveyance direction is set to be larger than the largest width of the widths of the sheets S on which the image forming apparatus 1 can form the image.

The fixing belt 29 is an endless belt having a multilayer structure, such as a two-layered belt including a base layer and a release layer or a three-layered belt including the base layer, an elastic layer, and the release layer. The surface of the fixing belt 29 including the elastic layer easily adheres to the toner image and enhances the image quality. The base layer of the fixing belt 29 is made of polyimide, and the release layer is made of perfluoroalkoxy alkane (PFA) or polytetrafluoroethylene (PTFE).

The heating roller 30 includes a heater 30*a* inside the heating roller 30, the heater 30*a* heats the heating roller 30, and the heating roller 30 heats the fixing belt 29. The fixing device 15 includes a temperature sensor to detect temperature of the surface of the fixing belt 29 in contact with the heating roller 30. Based on results detected by the temperature sensor, the controller 21 controls power supplied to the heater 30*a*. The heating roller 30 is rotatably supported by a frame of the fixing device 15 and is driven to rotate by rotation of the fixing belt 29.

The supply roller 31 around which the fixing belt 29 is wound includes a base 31*a* made of metal and a supplying portion 30*b* disposed around the base 31*a*. The base 31*a* is rotatably supported by a frame of fixing device 15, and a driver such as a motor fixed on the frame drives and rotates the base 31*a*. The driver drives and rotates the supply roller 31 clockwise in FIG. 2. The rotation of the supply roller 31 rotates the fixing belt 29 in a direction indicated by an arrow in FIG. 2.

The supplying portion 31*b* is made of a nonwoven fabric such as felt, aramid, or polyethylene terephthalate (PET), or a fiber body having heat resistance and oil retention such as perfluoro alkoxyl alkane (PFA) or polytetrafluoroethylene (PTFE) and is impregnated with a low-viscosity lubricant having heat resistance, such as aminosilicone oil.

The tension roller 32 around which the fixing belt 29 is stretched is rotatably supported by a support plate that is movably supported by the frame of the fixing device 15. A compression spring 32*a* that urges the tension roller 32 leftward in FIG. 2 is attached to the support plate, and the tension roller 32 applies a predetermined tensile force to the fixing belt 29.

The sliding pad 33 is fixed on a stay, and the stay is fixed on the frame of the fixing device 15. As a result, the position of the sliding pad 33 does not change even when the pressure roller 35 presses the sliding pad 33, which enables forming a uniform width of the fixing nip. Controlling force pressing the pressure roller 35 enables controlling the width of the fixing nip.

The sliding pad 33 has a nip formation surface along the sheet conveyance direction of the sheet S. To reduce the sliding friction between the sliding pad 33 and the fixing belt 29, a fluororesin layer is disposed on the nip formation surface. The sliding pad 33 has curves at both ends of the nip formation surface. The nip formation surface in the present embodiment has a curved surface but may have a flat surface. The curved surface of the sliding pad 33 is designed so as not to interfere with the conveyance of the sheet S.

The sliding pad 33 is preferably made of a heat-resistant material. This prevents thermal deformation of the sliding pad 33 at temperatures in a fixing temperature range desirable to fix the toner image on the sheet S, retains the fixing nip stably, and stabilizes output image quality.

Examples of the heat-resistant material of the sliding pad 33 include general heat-resistant resin such as polyether sulfone (PES), polyphenylene sulfide (PPS), liquid crystal polymer (LCP), polyether nitrile (PEN), polyamide imide (PAI), and polyether ether ketone (PEEK).

The collector 34 is disposed between the sliding pad 33 and the fixing belt 29. The collector 34 is described later.

The pressure roller 35 is disposed outside the fixing belt 29 and faces the fixing belt 29 on the sliding pad 33. A contact-and-separation mechanism moves the pressure roller 35 to press against or separate from the fixing belt 29 on the sliding pad 33. The pressure roller 35 functions as an elastic body and includes an elastic layer made of, for example, silicon rubber, and the elastic layer forms an outer peripheral surface of the pressure roller 35. The pressure roller 35 presses the sliding pad 33 via the fixing belt 29 and elastically deforms to form the fixing nip N illustrated in FIG. 3.

The guide 36 includes a plate fixed on the frame of the fixing device 15 and guides the sheet S conveyed by the conveyor 37 toward the fixing nip N.

Driving and rotating the supply roller 31 rotates the fixing belt 29. The rotation of the fixing belt 29 rotates the heating roller 30. The supplying portion 31*b* supplies the lubricant to the inner face of the fixing belt 29. The conveyor 37 conveys the sheet S to the fixing device 15, and the guide 36 guides the sheet S to the fixing nip N. The rotation of the pressure roller 35 conveys the sheet S in the fixing nip N. Heat is transmitted from the heater 30*a* to the sheet S via the heating roller 30 and the fixing belt 29 to melt the toner transferred on the sheet S. and pressure applied by the pressure roller 35 in addition to the heat fixes the toner image onto the sheet S.

In the above-described configuration, since the lubricant supplied from the supply roller 31 to the inner face of the fixing belt 29 has a low viscosity, the lubricant tends to gather at a lower portion of an inner peripheral portion of the fixing belt 29 in the vertical direction in FIG. 2. The inner peripheral portion is inside the loop of the fixing belt 29 illustrated in FIG. 2 and includes the inner face of the fixing belt 29. As a result, a lubricant excess region 38 is formed as illustrated in FIG. 2. After the lubricant excess region 38 is formed, the lubricant in the lubricant excess region 38 leaks from both ends of the fixing belt 29 to the outside of the fixing belt 29 and adheres to parts inside the image forming apparatus and the output image, thereby causing contamination in the image forming apparatus and an image defect. The depletion of the lubricant due to the leakage increases the frictional resistance between the sliding pad 33 and the fixing belt 29 and accelerates the wear of the fixing belt 29, which affects the durability of the fixing belt 29. In addition, particles such as toner and dust enter the lubricant collected from the lubricant excess region 38 by the collector made of felt, increase the viscosity of the lubricant, and prevents maintaining low torque, which also affects the durability of the fixing belt 29. Further, the felt includes the non-woven fabric made of aramid or polyethylene terephthalate (PET). When the base layer of the fixing belt 29 is made of polyimide and slides on the felt at high speed, abrasion of the polyimide is accelerated, which accelerates increase in the viscosity of the lubricant. As a result, the durability of the fixing belt 29 is deteriorated.

The following describes a collector 34 of the present embodiment to prevent the occurrence of the above-described disadvantages.

One end of the collector 34 is fixed to the frame of the fixing device 15, and the other end is disposed between the fixing belt 29 and the sliding pad 33. Similar to the supplying portion 31*b*, the collector 34 is made of the nonwoven fabric such as felt, aramid, or polyethylene terephthalate (PET), or the fiber body having heat resistance and oil retention such as perfluoro alkoxyl alkane (PFA) or polytetrafluoroethylene (PTFE).

Figure 4:
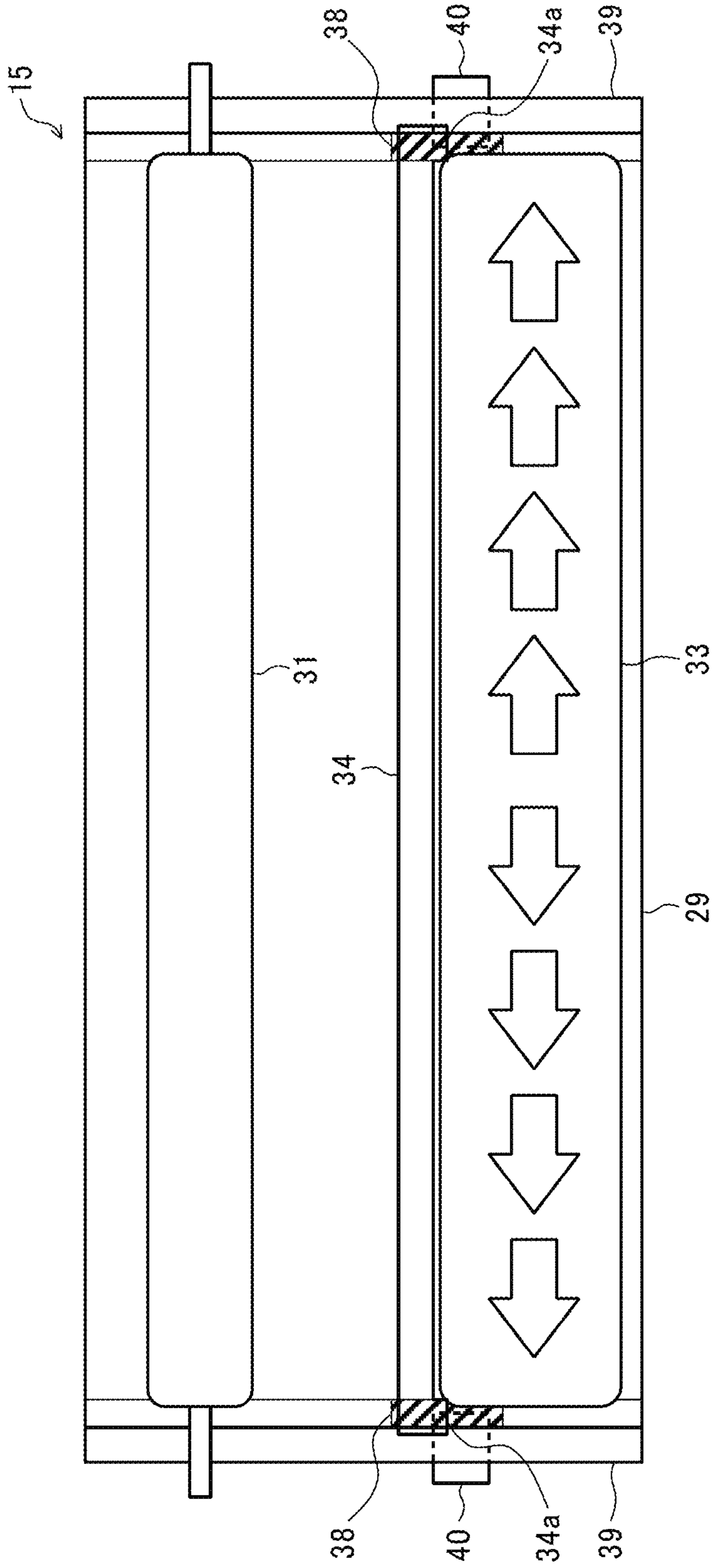
FIG. 4 is a schematic diagram illustrating a collector, a nip formation pad, and a fixing belt in fixing device according to an embodiment of the present disclosure.

As illustrated in FIG. 4, the collector 34 is longer than the sliding pad 33 in a width direction of the collector 34 that is a longitudinal direction of the sliding pad 33 and an axial direction of the supply roller 31. Both ends 34*a*, 34*a* of the collector 34 in the width direction are in contact with the inner face of the fixing belt 29. In other words, the collector 34 has a first end contacting an inner face of one end of the belt in the width direction of the belt and a second end contacting the inner face of another end of the belt opposite to the one end in the width direction. The collector 34 is positioned so that positions at which the both ends 34*a* are in contact with the inner face of the fixing belt 29 coincide with the above-described lubricant excess region 38.

The lubricant moves in a direction indicated by white arrows in FIG. 4 while the fixing nip is formed. The fixing device includes guide ribs 39 to movably support the fixing belt 29 as illustrated in FIG. 4. The lubricant excess region 38 is formed at a position between each of the guide ribs 39 and each of both ends of the sliding pad 33 in the width direction of the fixing belt 29.

The collector 34 in the above-described configuration collects the lubricant accumulated in the lubricant excess region 38 in which the lubricant is most concentrated on the inner face of the fixing belt 29 and prevents the lubricant from leaking from the both ends of the fixing belt 29. The collector 34 having both ends 34*a*, 34*a* contacting the inner face of the fixing belt 29 and another part not contacting the inner face of the fixing belt 29 can minimize the abrasion of the inner peripheral portion of the fixing belt 29 and maintain the durability of the fixing belt 29.

Figure 5:
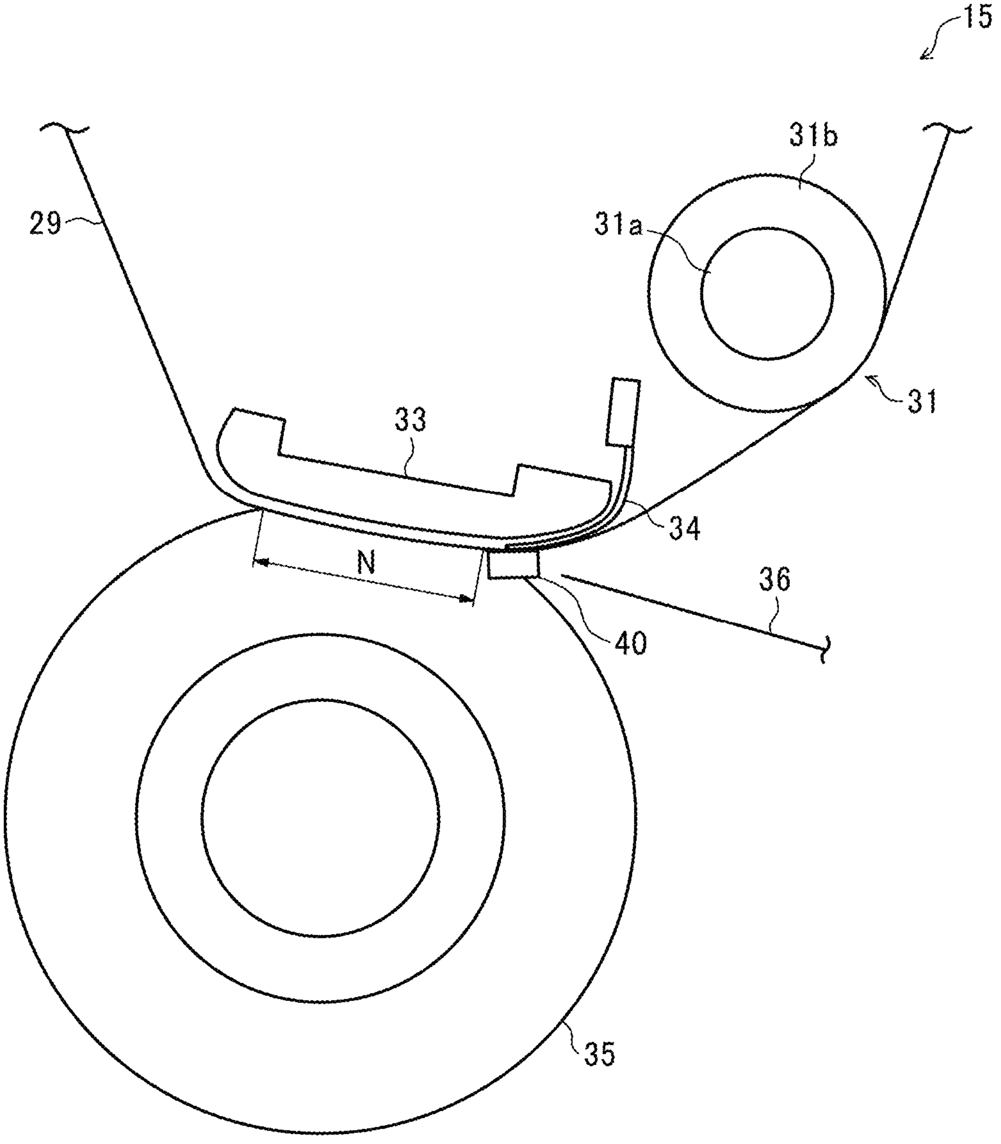
FIG. 5 is a partially enlarged view of a fixing device according to a modification of the embodiment of the present disclosure.

FIG. 5 is a partially enlarged view of a fixing device according to a modification of the embodiment described above. The difference between the modified example and the above-described embodiment is second collectors 40 disposed in the fixing device 15.

The second collector 40 is made of the same material as that of the collector 34. As illustrated in FIG. 5, the second collectors 40 are disposed at a lower portion of an outer peripheral portion of the fixing belt 29 in the vertical direction in FIG. 5. Each of the second collectors 40 is at a position corresponding to the lubricant excess region 38 on the outer peripheral face of the fixing belt 29. As illustrated in FIG. 4, one of the second collectors 40 face one of both ends 34*a* via the fixing belt 29, and the other one of the second collectors 40 faces the other one of both ends 34*a* via the fixing belt 29. In other words, the second collector 40 as another collector has a third end contacting an outer face of the one end of the belt in the with direction and a fourth end contacting the outer face of said another end of the belt in the width direction. The second collector 40 is supported by a bracket attached to the guide ribs 39.

In the above-described configuration, even when a supply amount of the lubricant supplied to the fixing belt 29 exceeds an allowable amount that the collector 34 can collect, the second collector 40 absorbs the lubricant outside the fixing belt 29 and prevents the contamination of parts inside the image forming apparatus and the occurrence of the abnormal image.

In the above-described embodiment and modification, the image forming apparatus 1 is the printer forming the full-color toner image as an example of the image forming apparatus according to the present embodiment, but the image forming apparatus is not limited to this. The present disclosure is also adoptable to a copier, a facsimile machine, and a multifunction peripheral (MFP).

In the above-described embodiment, the sheet S is mentioned as an example of the recording medium on which an image is formed and is not limited the standard paper but also includes thick paper, a postcard, a rolled sheet, an envelope, plain paper, thin paper, coated paper, art paper, tracing paper, an overhead projector transparency (OHP sheet or OHP film), a resin film, and any other sheet-shaped material on which an image can be formed.

Aspects of the present disclosure are, for example, as follows.

<First Aspect>

In a first aspect, a fixing device includes a belt, a pad, a pressure rotator, a lubricant supplier, and a collector. The belt forms a loop. The pad is inside the loop of the belt and contacts the belt. The pressure rotator presses the belt against the pad to form a fixing nip between the belt and the pressure rotator. The lubricant supplier supplies lubricant to an inner face of the belt. The collector collects the lubricant. The collector has a first end and a second end. The first end contacts an inner face of one end of the belt in a width direction of the belt. The second end contacts the inner face of another end of the belt opposite to the one end in the width direction.

<Second Aspect>

In a second aspect, the fixing device according to the first aspect further includes another collector to collect the lubricant. Said another collector has a third end and a fourth end. The third end contacts an outer face of the one end of the belt in the with direction. The fourth end contacts the outer face of said another end of the belt in the width direction.

<Third Aspect>

In a third aspect, the first end and the second end of the collector in the fixing device according to the first aspect or the second aspect contact the inner face of a lower portion of the belt in a vertical direction.

<Fourth Aspect>

In a fourth aspect, a part of the collector in the fixing device according to any one of the first to third aspects is between the pad and the belt.

<Fifth Aspect>

In a fifth aspect, the third end and the fourth end of said another collector in the fixing device according to any one of the second to fourth aspects contact the inner face of a lower portion of the belt in a vertical direction.

<Sixth Aspect>

In a sixth aspect, the first end and the second end of the collector in the fixing device according to any one of the first to fifth aspect are made of fiber.

<Seventh Aspect>

In a seventh aspect, the third end and the fourth end of said another collector in the fixing device according to any one of the second to sixth aspects are made of fiber.

<Eighth Aspect>

In an eighth aspect, the first end and the second end of the collector in the fixing device according to any one of the first to seventh aspects are made of nonwoven fabric.

<Ninth Aspect>

In a ninth aspect, the third end and the fourth end of said another collector in the fixing device according to any one of the second to eighth aspects are made of nonwoven fabric.

<Tenth Aspect>

In a tenth aspect, the collector in the fixing device according to any one of the first to ninth aspects is longer than the pad in the width direction, and the first end and the second end are respectively at one end and another end of the collector.

<Eleventh Aspect>

In an eleventh aspect, the fixing device according to any one of the first to tenth aspects further includes guide ribs supporting the belt. The first end of the collector contacts the inner face of the belt between one of the guide ribs and the pad, and the second end of the collector contacts the inner face of the belt between another one of the guide ribs and the pad.

<Twelfth Aspect>

In a twelfth aspect, the third end of said another collector in the fixing device according to any one of the second to eleventh aspects is opposed to the first end of the collector via the belt, and the fourth end of said another collector in the fixing device according to any one of the second to eleventh aspects is opposed to the second end of the collector via the belt.

<Thirteenth Aspect>

In a thirteenth aspect, an image forming apparatus includes the fixing device according to any one of the first to twelfth aspects.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. A fixing device comprising:

a belt forming a loop;

a pad inside the loop of the belt and contacting the belt;

a pressure rotator to press the belt against the pad to form a fixing nip between the belt and the pressure rotator;

a lubricant supplier to supply lubricant to an inner face of the belt; and a collector to collect the lubricant, the collector including:

a first end contacting an inner face of one end of the belt in a width direction of the belt; and a second end contacting the inner face of another end of the belt opposite to the one end in the width direction, wherein a part of the collector is between the pad and the belt.

2. The fixing device according to claim 1, further comprising:

another collector to collect the lubricant, said another collector including:

a third end, contacting an outer face of the one end of the belt in the width direction; and a fourth end contacting the outer face of said another end of the belt in the width direction.

3. The fixing device according to claim 1, wherein the first end and the second end of the collector contact the inner face of a lower portion of the belt in a vertical direction.

4. The fixing device according to claim 2, wherein the third end and the fourth end of said another collector contact the outer face of a lower portion of the belt in a vertical direction.

5. The fixing device according to claim 1, wherein the first end and the second end of the collector are made of fiber.

6. The fixing device according to claim 2, wherein the third end and the fourth end of said another collector are made of fiber.

7. The fixing device according to claim 1, wherein the first end and the second end of the collector are made of non-woven fabric.

8. The fixing device according to claim 2, wherein the third end and the fourth end of said another collector are made of non-woven fabric.

9. The fixing device according to claim 1, wherein;

the collector is longer than the pad in the width direction, and the first end and the second end are respectively at one end and another end of the collector.

10. The fixing device according to claim 1, further comprising:

guide ribs supporting the belt, wherein:

the first end of the collector contacts the inner face of the belt between one of the guide ribs and the pad, and the second end of the collector contacts the inner face of the belt between another one of the guide ribs and the pad.

11. The fixing device according to claim 2, wherein;

the third end of said another collector is opposed to the first end of the collector via the belt, and the fourth end of said another collector is opposed to the second end of the collector via the belt.

12. An image forming apparatus comprising:
the fixing device according to claim 1.

13. A fixing device comprising:
a belt forming a loop;
a pad inside the loop of the belt and contacting the belt;
a pressure rotator to press the belt against the pad to form a fixing nip between the belt and the pressure rotator;
a lubricant supplier to supply lubricant to an inner face of the belt;
a collector to collect the lubricant, the collector including:
a first end contacting an inner face of one end of the belt in a width direction of the belt; and
a second end contacting the inner face of another end of the belt opposite to the one end in the width direction; and
guide ribs supporting the belt,
wherein:
the first end of the collector contacts the inner face of the belt between one of the guide ribs and the pad, and
the second end of the collector contacts the inner face of the belt between another one of the guide ribs and the pad.

14. The fixing device according to claim 13, further comprising:
another collector to collect the lubricant, said another collector including:
a third end, contacting an outer face of the one end of the belt in the width direction; and
a fourth end contacting the outer face of said another end of the belt in the width direction.

15. The fixing device according to claim 13,
wherein the first end and the second end of the collector contact the inner face of a lower portion of the belt in a vertical direction.

16. The fixing device according to claim 14,
wherein the third end and the fourth end of said another collector contact the outer face of a lower portion of the belt in a vertical direction.

17. The fixing device according to claim 13,
wherein the first end and the second end of the collector are made of fiber.

18. The fixing device according to claim 14,
wherein the third end and the fourth end of said another collector are made of fiber.

19. The fixing device according to claim 13,
wherein the first end and the second end of the collector are made of non-woven fabric.

20. An image forming apparatus comprising:
the fixing device according to claim 13.

* * * * *